(12) United States Patent
Okutomi et al.

(10) Patent No.: US 7,126,725 B2
(45) Date of Patent: Oct. 24, 2006

(54) IMAGE READING APPARATUS AND IMAGE FORMING APPARATUS EQUIPPED THEREWITH

(75) Inventors: Ryuji Okutomi, Tokyo (JP); Hiroyuki Futami, Tokyo (JP); Jun Nakagawa, Tokyo (JP); Tadayuki Ueda, Tokyo (JP); Eiji Nishikawa, Tokyo (JP)

(73) Assignee: Konica Corporation, Tokyo (JP)

( * ) Notice: Subject to any disclaimer, the term of this patent is extended or adjusted under 35 U.S.C. 154(b) by 928 days.

(21) Appl. No.: 10/122,656

(22) Filed: Apr. 15, 2002

(65) Prior Publication Data

US 2002/0159100 A1   Oct. 31, 2002

(30) Foreign Application Priority Data

Apr. 27, 2001   (JP) ............................. 2001-131657

(51) Int. Cl.
*H04N 1/04* (2006.01)
(52) U.S. Cl. ...................... 358/474; 358/509; 358/475; 382/274; 382/254
(58) Field of Classification Search ................ 358/474, 358/509, 475, 505, 448, 461; 382/274, 254
See application file for complete search history.

(56) References Cited

U.S. PATENT DOCUMENTS

| 5,099,341 | A  | * | 3/1992  | Nosaki et al. ............... 358/461 |
| 5,214,784 | A  | * | 5/1993  | Ward et al. .................... 714/39 |
| 6,172,784 | B1 | * | 1/2001  | Konda ......................... 359/196 |
| 6,175,660 | B1 | * | 1/2001  | Nabeshima et al. ......... 382/274 |
| 6,330,083 | B1 | * | 12/2001 | Nabeshima et al. ......... 358/474 |
| 6,958,834 | B1 | * | 10/2005 | Ide .............................. 358/505 |

* cited by examiner

*Primary Examiner*—Douglas Q. Tran
*Assistant Examiner*—Negussie Worku
(74) *Attorney, Agent, or Firm*—Frishauf, Holtz, Goodman & Chick, P.C.

(57) ABSTRACT

In a document reading apparatus having a scanning exposure reading system by which a document placed on a platen is scanning exposed by an optical system and a document image is read out, or a document reading system by which a moving document is read out by an optical system, at the first collection position and the second collection position which are different in the sub-scanning direction of the scanning expose on a reference density plate, the first shading correction data and the second shading correction data are respectively read in the main scanning direction, and the shading position is corrected on the basis of the read first and second shading correction data.

12 Claims, 9 Drawing Sheets

IMAGE READING APPARATUS AND IMAGE FORMING APPARATUS EQUIPPED THEREWITH

BACKGROUND OF THE INVENTION

The present invention relates to a document reading apparatus having a document reading system while a document is moving and/or a scanning exposure reading system while a document is stationary, and further, the present invention relates to an image forming apparatus provided with the document reading apparatus.

The document reading apparatus in the conventional image forming apparatus has a shading correction function, and as the shading correction function, a system by which a predetermined area of a reference density plate is read out, and the shading correction data is averaged, is adopted, however, because also a dust adhered to the reference density plate is averaged, there is a problem that it is difficult to conduct a correct shading correction.

Therefore, in order to simply and surely conduct the proper shading correction, the following method is well known. FIG. 8(a) is an illustration of finding method of the shading correction data, and FIG. 8(b) is a view showing the abnormality of the shading correction data. As shown in FIGS. 8(a) and 8(b), the collection of the shading correction data F1 and F2 is conducted at two collection positions of the reference density plate, and only the data whose brightness value is higher is selected, and is made the shading correction data F.

However, because two collection positions of the reference density plate are fixed, as shown in FIG. 8(b), for example, when a dust adhered onto the collection position of the shading correction data F1, the brightness value is quickly lowered at the dust adhered position, and the data difference between the shading correction data F1 and F2 is increased at the lowered position, and there is a problem that the correction is not correctly conducted.

Further, FIG. 9 is a view showing an influence on the unnecessary light at the time of the shading correction data collection. In FIG. 9, an exposure unit 16 of a document reading apparatus is composed of the moving body 160, the first mirror 161, and the light source 162, and the reference density plate 15 for the shading correction is positioned and fixed on the upper surface of a slit exposure glass 12 inside a document guide member 120. The reflection light of the reference density plate 15 illuminated by the light source 162 is incident on a CCD image sensor, not shown, through the exposure unit 16, and is photo-electrically converted by this CCD image sensor. In two collection positions 15a and 15b of the reference density plate 15, for example, when the collection position 15a is deviated to a collection position 151a shown by a solid line, an unnecessary light L1 is generated, and an error is generated in the shading correction data, and when the collection position 15b is deviated to a collection position 151b shown by a dotted line, the unnecessary light L2 is generated, and the error is generated in the shading correction data. However, even when the position dislocation of the collection position is generated, there is also a problem that the collection position dislocation cannot be previously detected.

SUMMARY OF THE INVENTION

In view of the above problems, the present invention is attained, and the first object is to provide a document reading apparatus by which, in both cases of the document reading system while a document is moving and the scanning exposure reading system while the document is stationary, the stable and correct shading correction can be conducted, and the document is accurately read out, and which has good performance.

Further, the second object is to provide an image forming apparatus by which the correct reference density measurement for the shading correction is attained, and an appropriate image density can be obtained.

The above first object can be attained by any one of the following structures (1) to (4).

(1) A document reading apparatus having a scanning exposure reading system by which a document placed on a platen is scanning exposed by an optical system and a document image is read out, and/or a document reading system by which a moving document is read out by an optical system, which is characterized in that, at the first collection position and the second collection position which are different in the sub-scanning direction of the scanning exposure on a reference density plate, the first shading correction data and the second shading correction data are respectively read in the main scanning direction, and the shading position is corrected on the basis of the read first and second shading correction data.

(2) A document reading apparatus having a scanning exposure reading system by which a document placed on a platen is scanning exposed by an optical system and a document image is read out, and/or a document reading system by which a moving document is read out by an optical system, which is characterized in that, at the first collection position and the second collection position which are different in the sub-scanning direction of the scanning exposure on a reference density plate, the first shading correction data and the second shading correction data are respectively read in the main scanning direction, and when, at the same position in the main scanning direction of the first collection position and the second collection position, the difference between the first shading correction data and the second shading correction data is deviated by more than a predetermined value, the collection position at which the shading correction data shows the low brightness value, is moved in the sub-scanning direction by a predetermined distance and is made a new collection position, and according to the shading correction data read out at two collection positions, the shading correction is conducted.

(3) A document reading apparatus having a scanning exposure reading system by which a document placed on a platen is scanning exposed by an optical system and a document image is read out, and/or a document reading system by which a moving document is read out by an optical system, which is characterized in that: at the first collection position and the second collection position which are different in the sub-scanning direction of the scanning exposure on a reference density plate, the first shading correction data and the second shading correction data are respectively read in the main scanning direction, and when there is the difference larger than a predetermined value between adjoining data for each predetermined interval of at least one side shading correction data, the collection position at which the shading correction data having the difference is read, is moved by a predetermined distance in the sub-scanning direction and is made a new collection position, and according to the shading correction data read out at two collection positions, the shading correction is conducted.

(4) A document reading apparatus having a scanning exposure reading system by which a document placed on a platen is scanning exposed by an optical system and a document image is read out, and/or a document moving reading system by which a moving document is read out by an optical system, which is characterized in that: at the first collection position and the second collection position which are different in the sub-scanning direction of the scanning exposure on a reference density plate, the first shading correction data and the second shading correction data are respectively read in the main scanning direction, and when the difference between respective average values is larger than a predetermined value, the collection position at which the shading correction data whose absolute difference to a predetermined reference value is larger, is read out, is moved by a predetermined distance in the sub-scanning direction and is made a new collection position, and according to the shading collection data read out at two collection positions, the shading correction is conducted.

The second object can be attained by the following structure.

(5) An image forming apparatus which is characterized in that it is equipped with the document reading apparatus according to the structure (1), (2), (3) or (4).

DETAILED DESCRIPTION OF THE PREFERRED EMBODIMENT (The First Embodiment)

Figure 1:
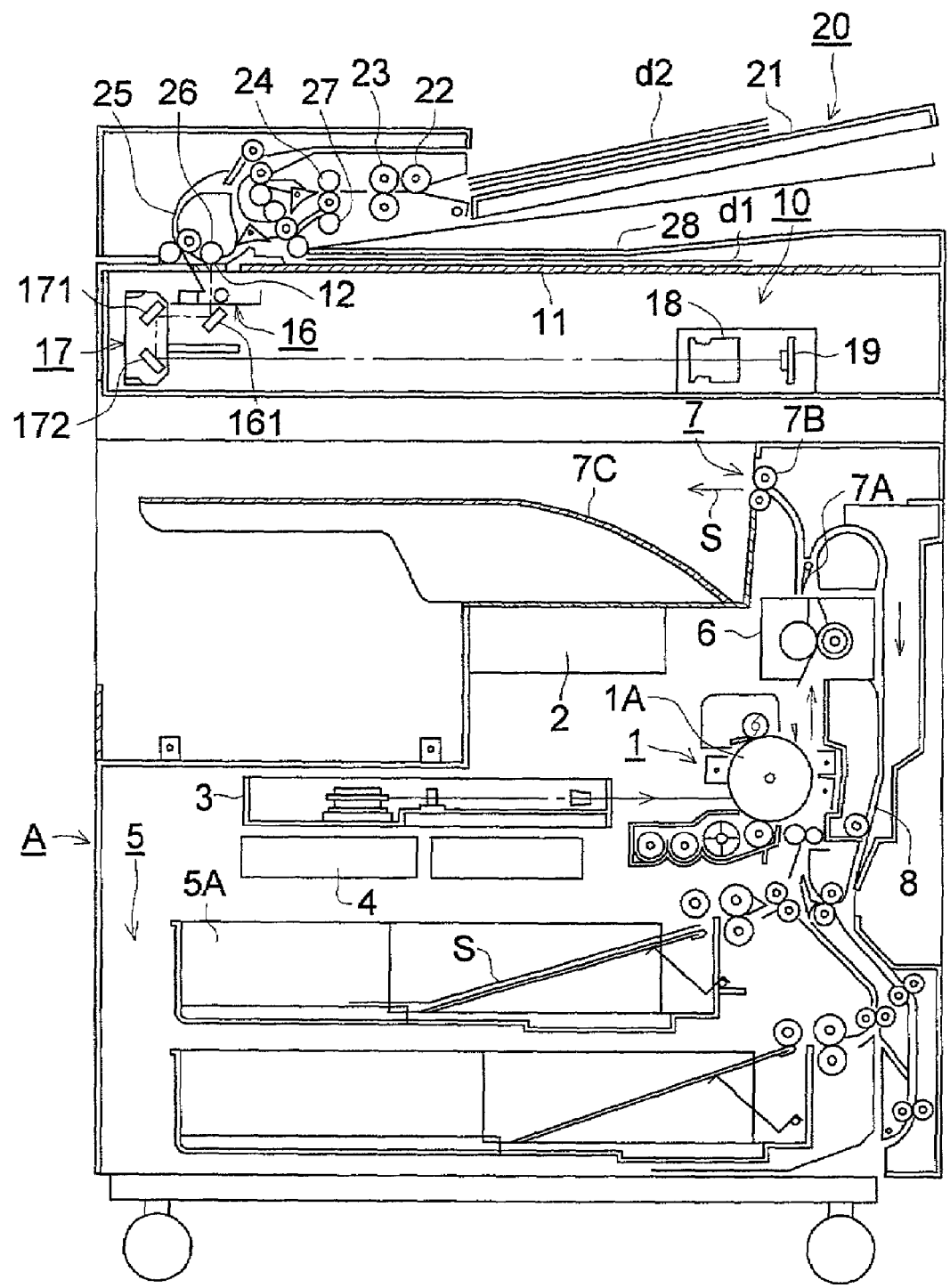
FIG. 1 is an overall structural view of an image forming apparatus to which a document reading apparatus of the present invention is applied.
Figure 2:
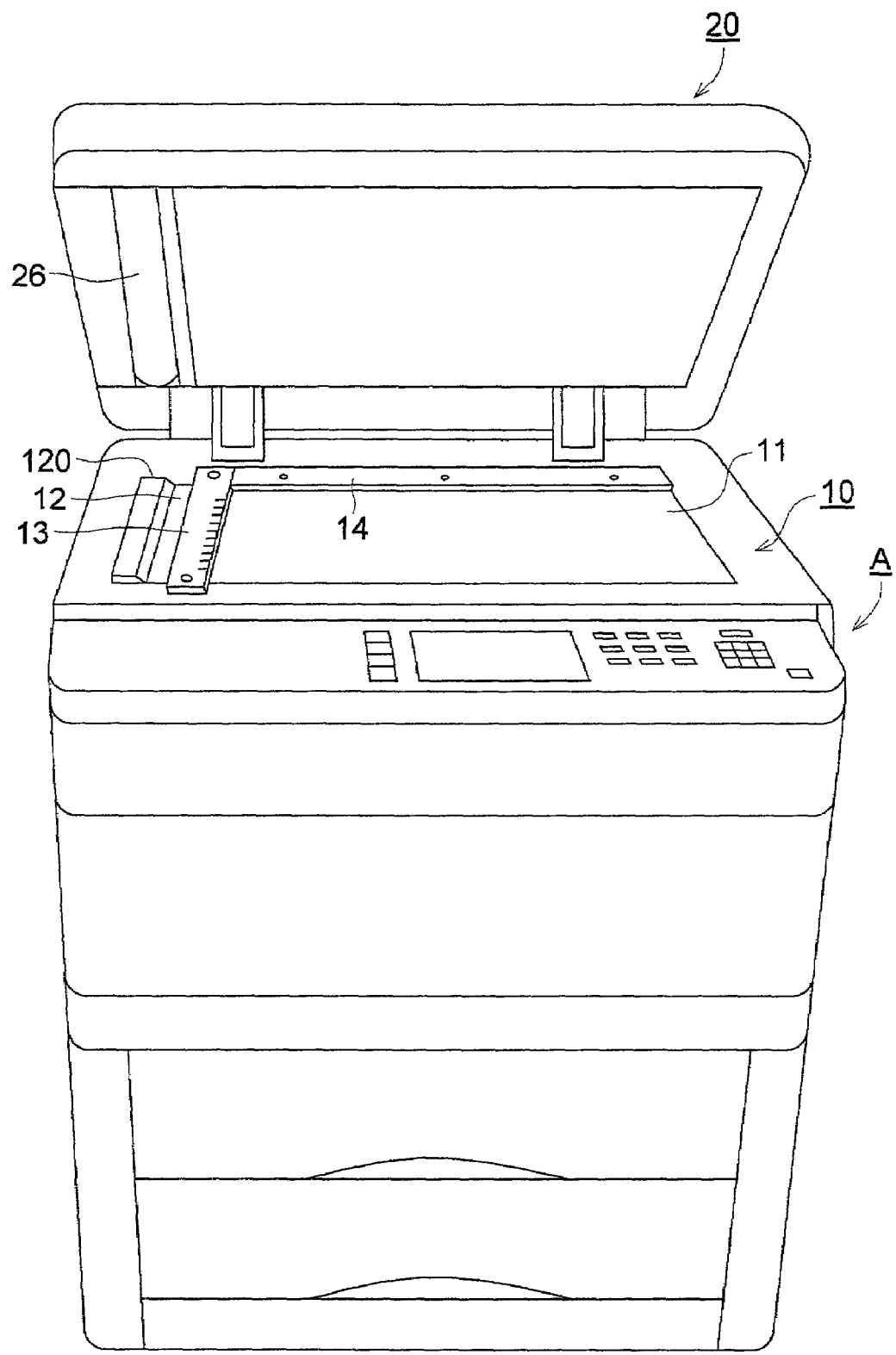
FIG. 2 is a perspective view of an image forming apparatus main body of FIG. 1 in which the upper surface of a platen glass is opened.

Referring to the drawings, a document reading apparatus and an image forming apparatus equipped with the document reading apparatus will be described below. FIG. 1 is an overall structural view of the image forming apparatus to which the document reading apparatus of the present invention is applied, and FIG. 2 is a perspective view of the image forming apparatus main body in FIG. 1 in which the upper surface of the platen glass is opened.

In FIG. 1, the image forming apparatus A is provided with an image forming section 1, image processing section 2, image writing section 3, high voltage electric power source section 4, sheet feed conveying section 5, fixing section 6, sheet delivery section 7, and re-conveying section (ADU) 8 for the automatic double sides copy. To the sheet delivery section 7 side of the left upper portion of the image forming apparatus main body A shown in the drawing, a sheet delivery tray 7C, or a sheet after-processing apparatus, not shown, can be connected.

A document d2 placed with the first surface facing upward on the document feeding table 21 of the automatic document feeding apparatus 20 is sent out by a sheet feed roller 22 and separation roller 23, and passes the conveying path 25 through a register roller 24, and at a position at which a document guiding member 26 and the upper surface of a slit exposure glass 12 are opposed to each other, an image on a one surface or both surfaces of the document d2 is read out by the optical system of the document reading apparatus 10. The document d2 after read out processed is delivered by the sheet delivery roller 27, and stacked on the sheet delivery tray 28.

The automatic document feeding apparatus 20 has a single side document reading function and both sides document reading function.

The optical system of the document reading apparatus 10 is composed of an exposure unit 16 provided with a light source and the first mirror 161, V mirror unit 17 composed of the second mirror 171 and the third mirror 172, image formation lens 18, and CCD image sensor 19.

The document reading by the automatic document feeding apparatus 20 is conducted at a position at which the exposure unit 16 is stopped below the slit exposure glass 12. The document reading is conducted when the document d2 passes the exposure unit 16 which is stopped. Further, the reading of the document d1 placed on the platen glass 11 is conducted by the scanning exposure while the exposure unit 16 and V mirror unit 17 are being moved. After the reading out of the stationary document d1 placed on the platen glass, and the moving document d2, the processing is conducted as shown in the main portion block diagram of the electric section in FIG. 4, which will be described later.

After, on an analog signal which is photoelectric converted by the CCD image sensor, the analog processing, A/D conversion, shading correction, and image compression processing is conducted in the image processing section 2, the signal is sent to the image writing section 3.

In the image writing section 3, the output light from the semiconductor laser is illuminated on the image carrier 1A of the image forming section 1 and forms a latent image. In the image forming section 1, the processing such as the charging, exposure, developing, transferring, separation, and cleaning, is conducted, and the image is transferred onto the sheet S fed from the sheet feed cassette 5A of the sheet feed conveying section 5. The sheet S on which the image is carried, is fixed by the fixing section 6, and delivered onto the sheet delivery tray 7C from the sheet delivery section 7. Or, after the sheet S whose one surface image is processed, which is sent into the reconveying means 8 by a delivery sheet path switching plate 7A is both surface image processed in the image forming section 1 again, it is delivered onto the sheet delivery tray 7C by the sheet delivery roller 7B of the sheet delivery section 7.

Next, in FIG. 2, in the upper portion of the image forming apparatus main body A, the platen glass 11, slit exposure glass 12, document contacting plate 13, and depth side document contacting plate 14 are arranged. The document contacting plate 13 is arranged in parallel with the short side direction of the platen glass 11, and one side edge of the document placed on the platen glass 11 is brought into contact with that, and the document is positioned. The depth side document contacting plate 14 is arranged in parallel with the long side direction of the platen glass 11, and the other side edge of the document placed on the platen glass 11 is brought into contact with that, and the document is positioned.

Figure 3:
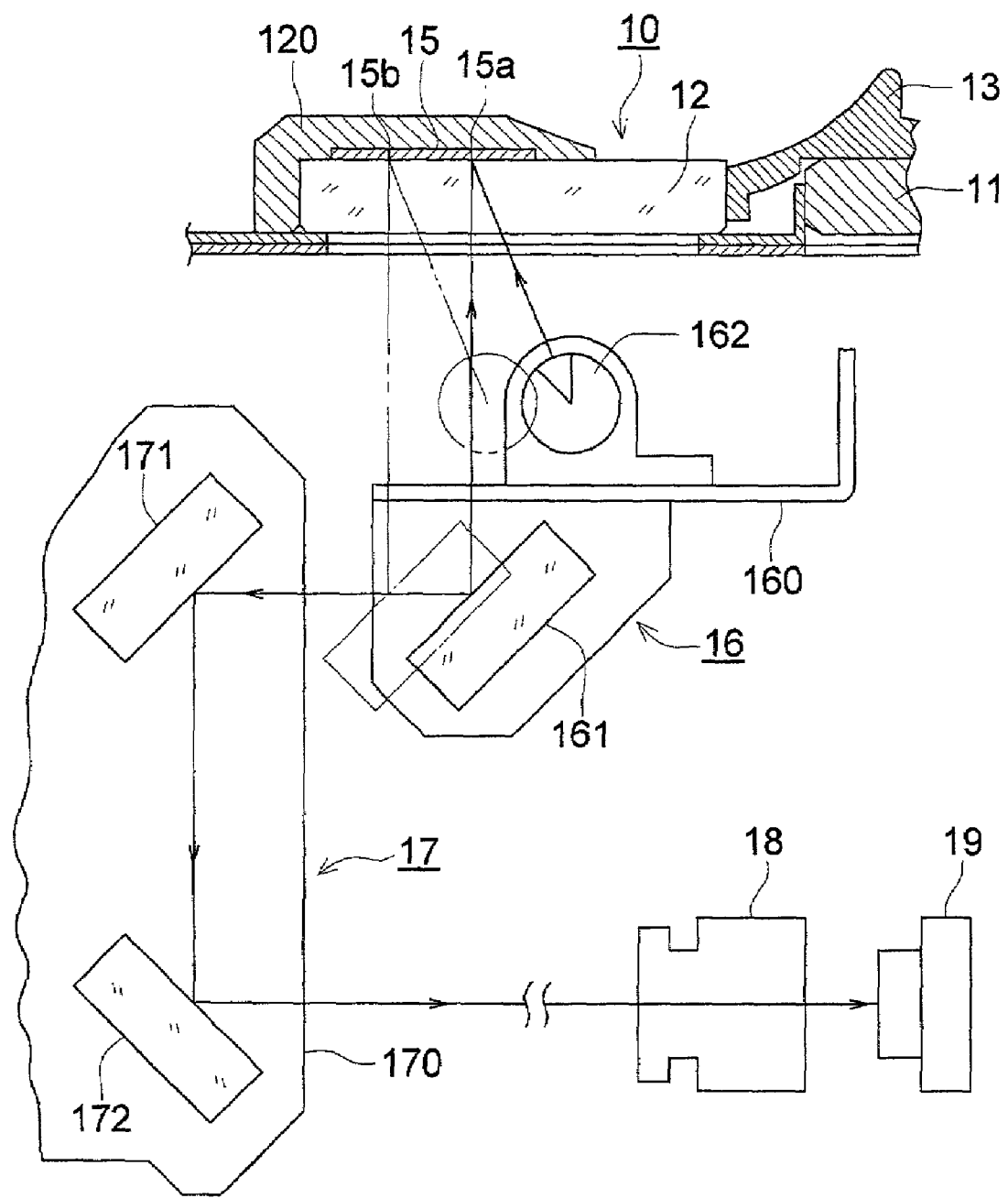
FIG. 3 is a sectional view showing an optical system when the first and second shading correction data are collected.

The optical system to collect the first and second shading correction data will be described below. FIG. 3 is a sectional view showing the optical system when the first and second shading correction data are collected. As shown in FIG. 3, the exposure unit 16 of the document reading apparatus 10 is composed of the moving body 160, the first mirror 161 and light source 162, and further the V mirror unit 17 is composed of the moving body 170, the second mirror 171 and the third mirror 172.

At the end portion of the platen glass 11, the document contacting plate 13 is fixed. Inside the document guiding member 120, a reference density plate 15 for the shading correction is positioned and fixed on the upper surface of the slit exposure glass 12. The reference density surface of the reference density plate 15 is closely contacted with the upper surface of the slit exposure glass 12.

Herein, when the mode of operation will be described, the reflected light which is illuminated by the light source 162 and reflected on the reference density plate 15, is incident on the CCD image sensor 19 as an image pick-up element through the exposure unit 16, V mirror unit 17, and image formation lens 18. The incident light is photoelectrically converted by this CCD image sensor 19, thereby the first and second shading correction data are collected.

Figure 4:
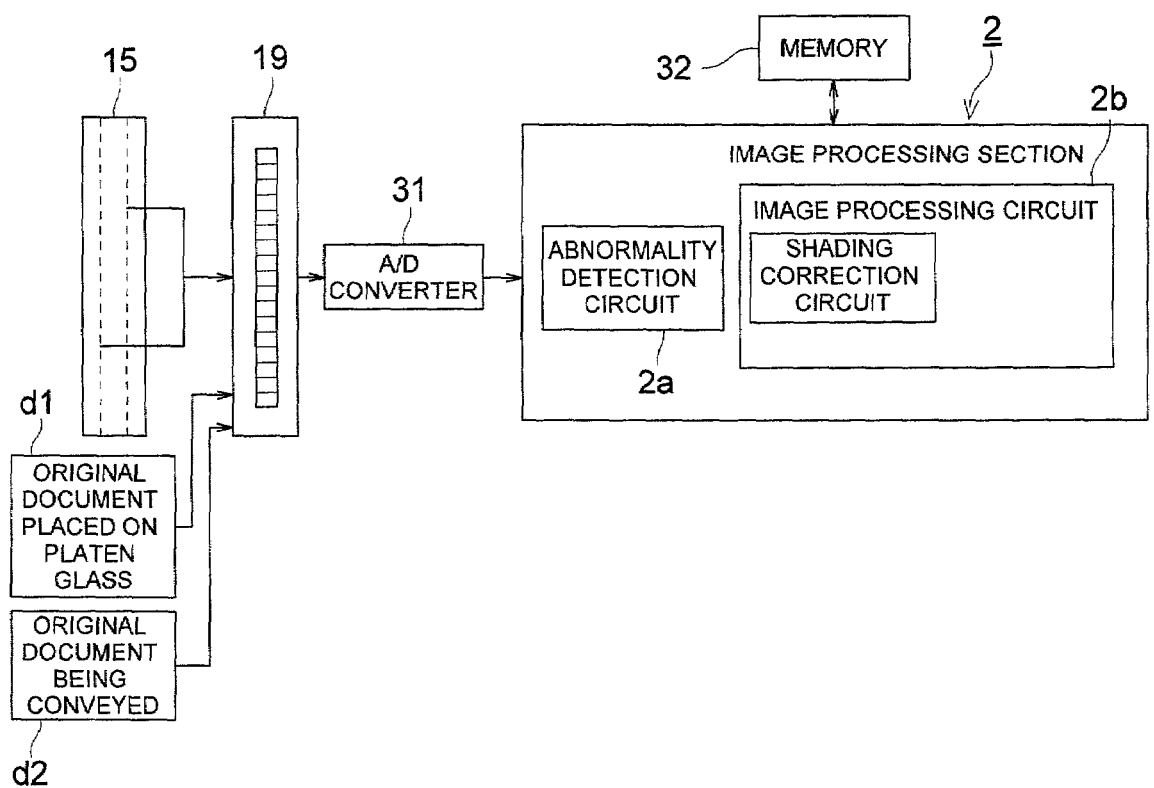
FIG. 4 is a main portion block diagram of an electric section of the document reading apparatus according to the embodiment of the present invention.

Next, the shading correction method will be described. FIG. 4 is a main portion block diagram of the electric section of the document reading apparatus according to the embodiment of the present invention, and FIG. 5(a) is a characteristic view of the first and second shading correction data and the brightness, FIG. 5(b) is a view showing the first and second shading correction data difference, and FIG. 5(c) is a view showing the data collection position on reference density plate.

In the document reading apparatus by which the image of the document is read by the CCD image sensor, the light distribution of the light source is not uniform, and in order to remove the influence on the lowering of the peripheral light amount according to the $\cos^4 \theta$ rule of the image formation lens, the fluctuation of the pixel by which the CCD image sensor is composed of, the taking-in of the data of the brightness which is a reference, and correction of the shading correction is conducted.

Figure 5:
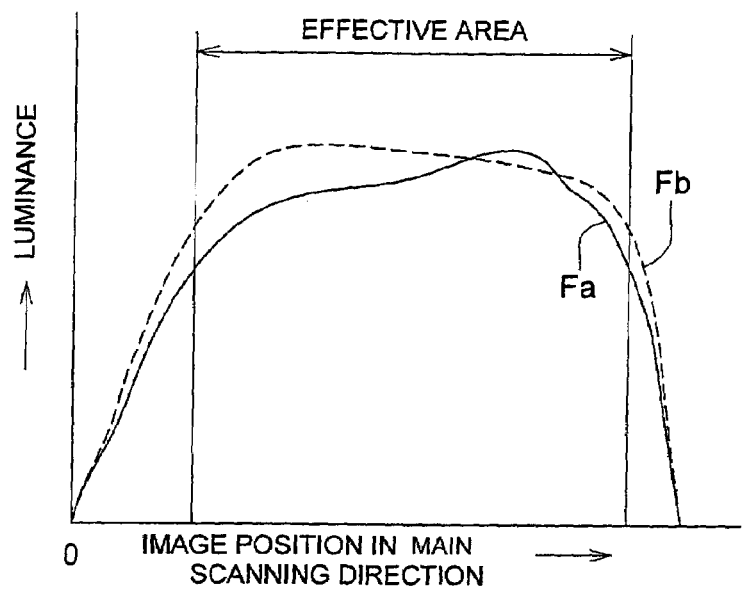
FIG. 5(a) is a characteristic view of the first and second shading correction data and the brightness.
FIG. 5(b) is a view showing the first and second shading correction data difference.
FIG. 5(c) is a view showing a data collection position on a reference density plate.
Figure 5:
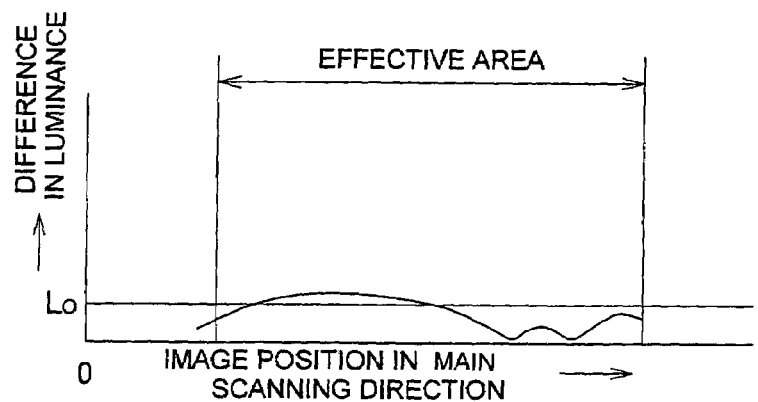
Figure 5:
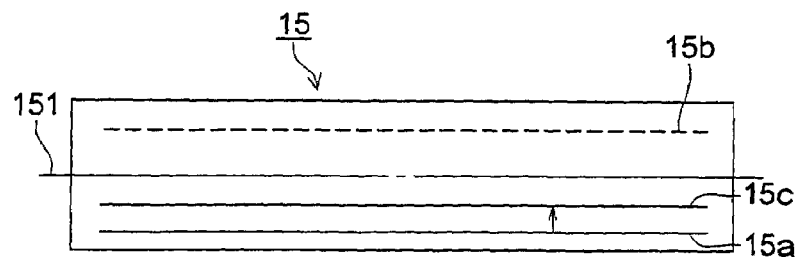

In FIGS. 4, and 5(a)–5(c), the analog output from the CCD image sensor 19 which is respectively read at the first collection position 15a and the second collection position 15b (refer to FIG. 5(c)), is read in through the A/D converter 31, and the brightness value (for example, at 600 dpi (number of dots per 2.54 cm), the brightness data to each pixel of about 7063 pixels in the main scanning direction in the case of the size A4 width) corresponding to each pixel is stored in the memory 32. The first shading correction data Fa and the second shading correction data Fb which are read out at the first collection position 15a and the second correction position 15b in the main scanning direction are respectively shown in FIG. 5(a).

Next, the difference between the first shading correction data Fa and the second shading correction data Fb is obtained by the abnormality detection circuit 2a in the image processing section 2, and checks whether this difference is within a predetermined value $L_0$. The checked result is shown in FIG. 5(b). In this example, there is a portion exceeding the predetermined value $L_0$.

When the difference between the first shading correction data Fa and the second shading correction data Fb is larger than a predetermined value $L_0$ at the same position in the main scanning direction, as shown in FIG. 5(c), the lower first collection position 15a is automatically moved to the side of the density plate center line 151 of the reference density plate 15, and is made a new collection position 15c and the reading is conducted again. In this connection, as the movement method of the collection position, for example, when the stop position of the moving body 160 as shown in FIG. 3 is changed, it can be conducted by the conventionally well known method.

After that, only the data of the higher brightness value of two shading correction data is selected by the shading correction circuit in the image processing circuit 2b provided in the image processing section 2 and the shading correction is conducted.

As described above, when there is the abnormality in the shading correction data, because the collection position of the shading correction data is moved and the data collection is conducted at the position at which there is no abnormality, the correct shading correction can be conducted. Further, in the image forming apparatus equipped with the document reading apparatus, the correct reference density correction for the shading correction is attained, and the high image quality image with an appropriate image density can be obtained.

(The Second Embodiment)

Referring to the drawings, another document reading apparatus of the present invention and another image forming apparatus equipped with the document reading apparatus will be described below. Except that the shading correction method of the second embodiment is different, because this embodiment is the same as the first embodiment, it will be described below centering on the different portion.

Figure 6:
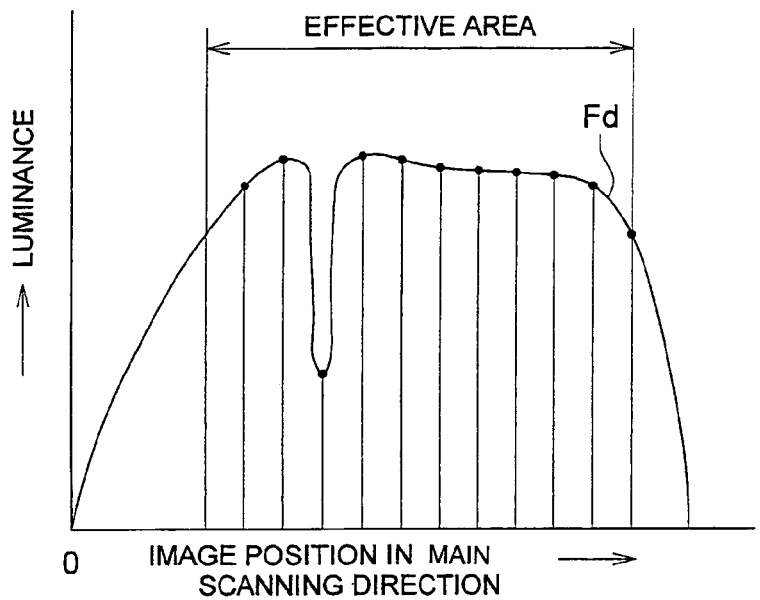
FIG. 6(a) is a characteristic view of the first shading correction data and the brightness.
FIG. 6(b) is a view showing the adjoining data difference of the first shading correction.
FIG. 6(c) is a view showing the data collection position on the reference density plate.
Figure 6:
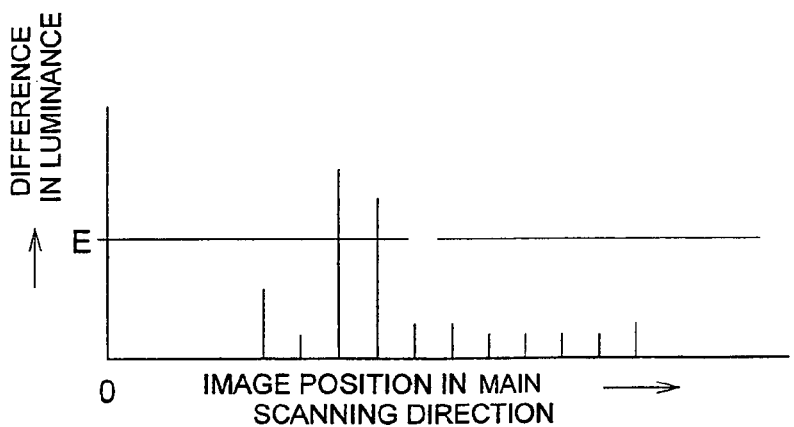
Figure 6:
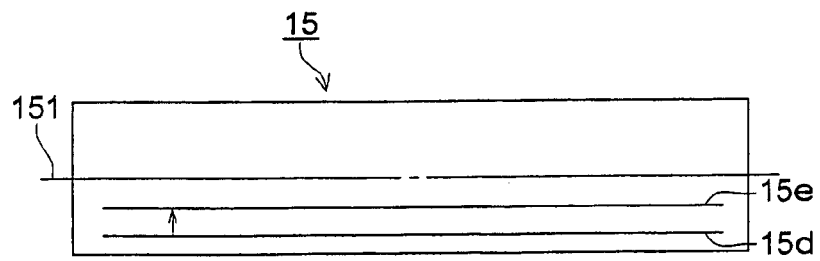

FIG. 6(a) is a characteristic view of the first shading correction data and brightness, FIG. 6(b) is a view showing the adjoining data difference of the first shading correction, and FIG. 6(c) is a view showing the data collection position on the reference density plate.

In the present embodiment, an example when there is an abnormality in the first shading correction data, will be described, however, it is the same as in the case of the second shading correction data.

In FIG. 4, and FIGS. 6(a)–6(c), the analog output from the CCD image sensor 19 read out at the first collection position 15d (refer to FIG. 6(c)) of the reference density plate 15 is read in through the A/D converter 31, and the brightness vale corresponding to each pixel is stored in the memory 32. The first shading correction data Fd read out at the first collection position 15d is shown FIG. 6(a).

Next, in the abnormality detection circuit 2a, it is checked whether the difference larger than a predetermined value E exists between the first shading correction data Fd stored in the memory 32 and data of a predetermined interval. The checked result is shown in FIG. 6(b). In this example, there is a portion at which the brightness value is rapidly lowered, because the dust adhered to the collection position, and therefore there is a difference larger than the predetermined value E.

When there is the difference larger than the predetermined value E between adjoining data for each predetermined interval of the shading correction data, as shown in FIG. 6(c), the first collection position 15d is automatically moved by a predetermined distance to the density plate center line 151 side, and is made a new collection position 15e, and the reading out is conducted again.

After that, by the shading correction circuit in the image processing circuit 2b, only the data whose brightness is higher of 2 shading correction data is selected, and the shading correction is conducted.

As described above, when there is an abnormality in the shading correction data, the collection position of the shading correction data is moved, and because the data is collected at the collection position at which the abnormality does not exist, the correct shading correction can be conducted. Further, in the image forming apparatus equipped with the document reading apparatus, the correct reference density correction for the shading correction is attained, and the high image quality image with an appropriate image density is obtained.

(The Third Embodiment)

Figure 7:
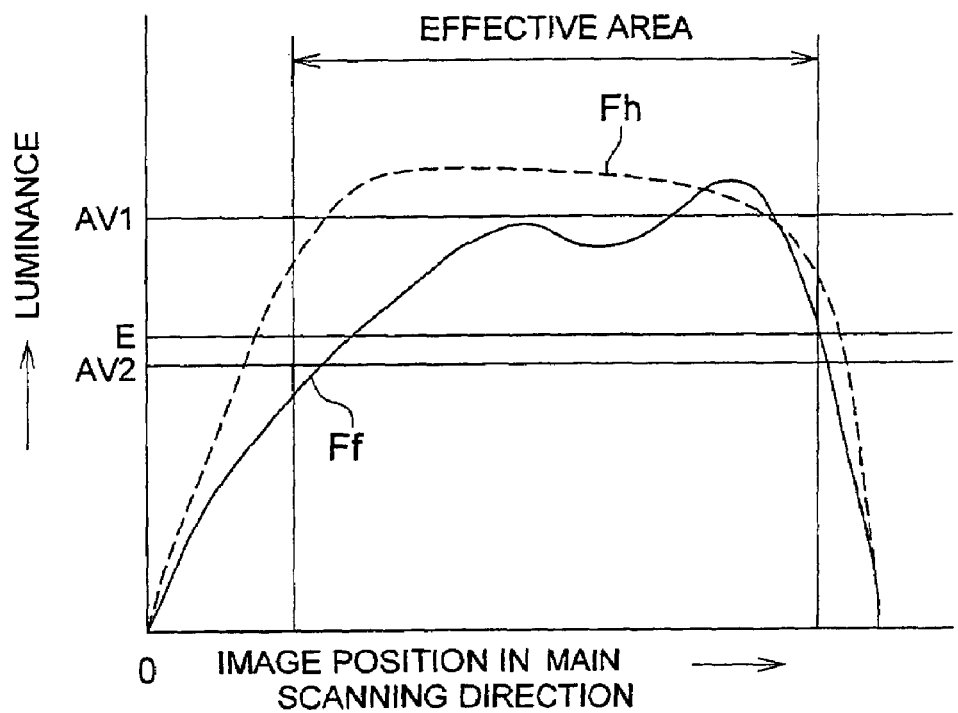
FIG. 7(a) is a characteristic view of the first and second shading correction data and the brightness.
FIG. 7(b) is a view showing the data collection position on the reference density plate.
Figure 7:
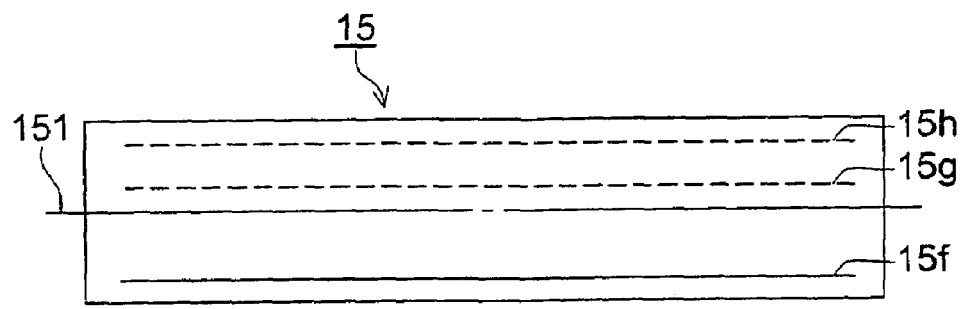
Figure 8:
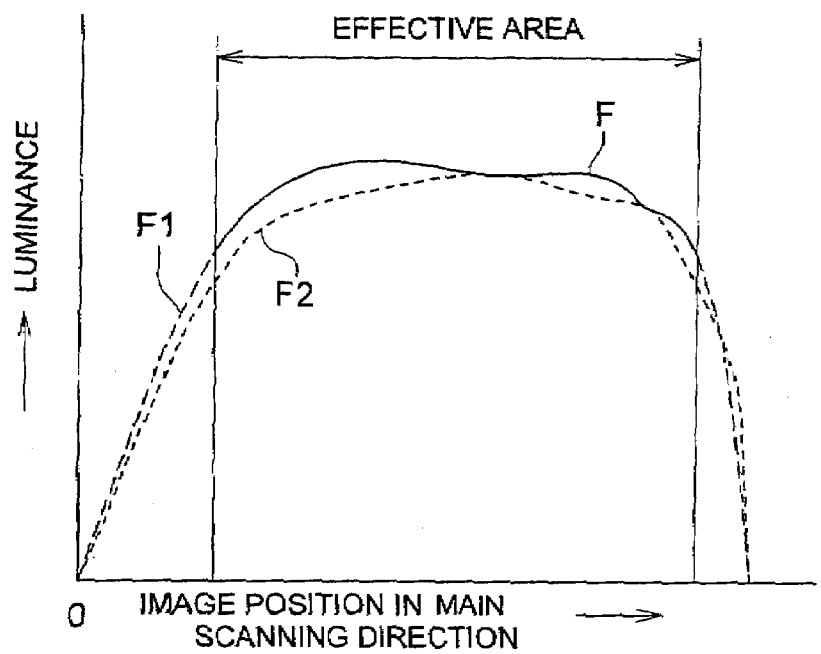
FIG. 8(a) is an illustration of how to find the shading correction data.
FIG. 8(b) is a view showing the abnormality of the shading correction data.
Figure 8:
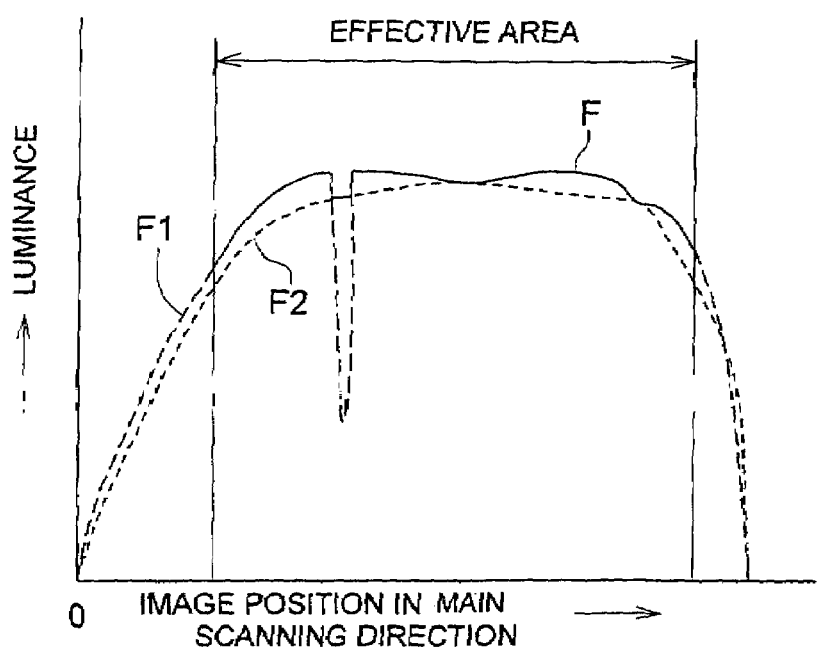
Figure 9:
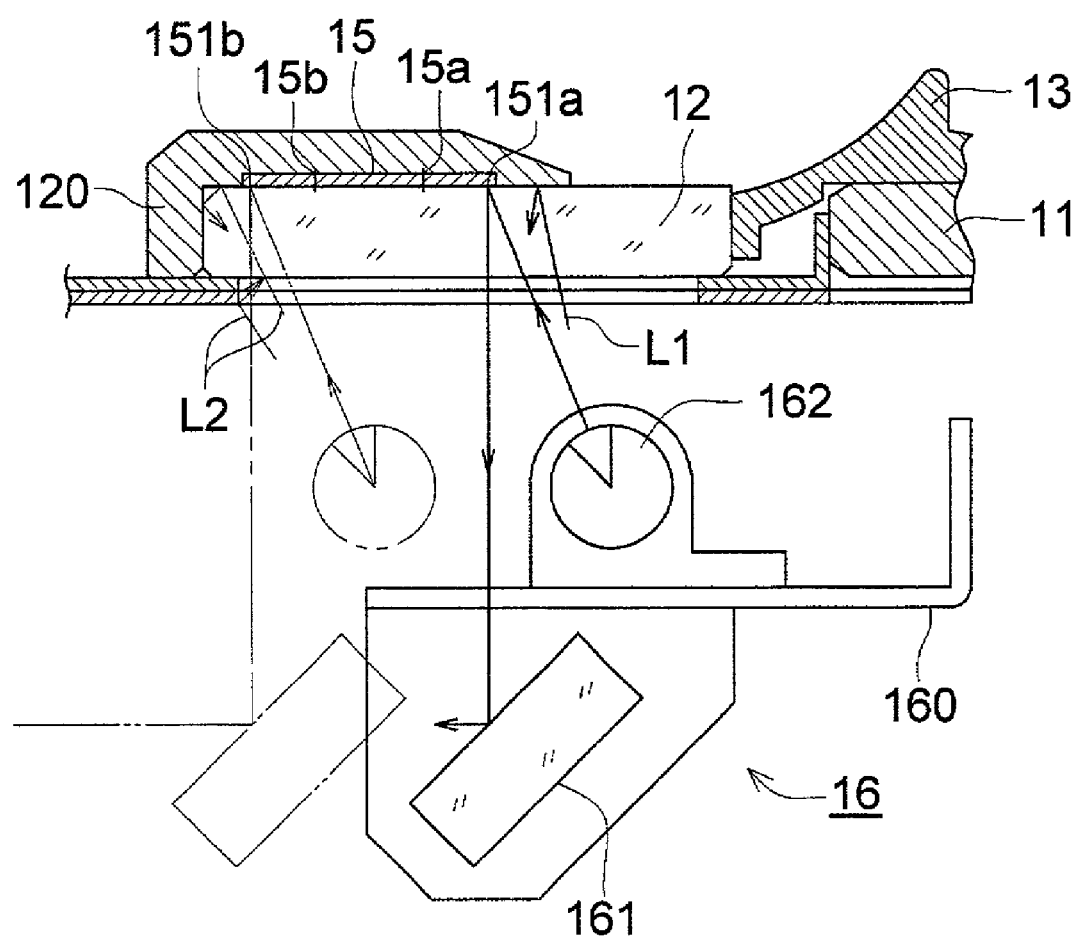
FIG. 9 is a view showing an influence on the unnecessary light at the time of the shading correction date collection.

Referring to the drawings, another document reading apparatus of the present invention and another image forming apparatus equipped with the document reading apparatus will be described below. Except that the shading correction method of the third embodiment is different, because it is the same as in the first embodiment, it will be described centering on the different portion. FIG. 7(a) is a characteristic view of the first and second shading correction data and the brightness, and FIG. 7(b) is a view showing the data collection position on the reference density plate.

In FIG. 4, and FIGS. 7(a) and 7(b), the analog output from the CCD image sensor 19 which is read out at the first collection position 15f, and the second collection position 15h (refer to FIG. 7(b)) of the reference density plate 15 is read through the A/D converter 31, and the brightness value corresponding to each pixel is stored in the memory 32. The first shading correction data Ff read out at the first collection position 15f, the second shading correction data Fh read out at the second collection position 15h are respectively shown in FIG. 7(a).

Next, in the abnormality correction circuit 2a, the respective average values AV1 and AV2 of the first and second shading correction data Ff, and Fh stored in the memory 32 are obtained, and checks whether the difference between 2 average values is within a predetermined value. When the difference between the averages is larger than the predetermined value, as shown in FIG. 7(b), the collection position 15h at which the absolute difference from the predetermined reference value E is larger, is automatically moved by a predetermined amount in the direction of the density plate center line 151 of the reference density plate 15, and is made a new collection position 15g, and the reading out is conducted again.

After that, by the shading correction circuit in the image processing circuit 2b, only the data whose brightness value is higher of two shading correction data is selected, and as the shading correction data, the shading correction is conducted.

As described above, when there is an abnormality in the shading correction data, the collection position of the shading correction data is moved and because the data is collected at the collection position at which there is no abnormality, the correct shading correction can be conducted. Further, in the image forming apparatus equipped with the document reading apparatus, the correct reference density correction for the shading correction is attained, and the high image quality image with an appropriate image density is obtained.

In this connection, in each of the above embodiments, in two shading correction data, only the data whose brightness value is higher is selected, and is made a shading correction data, however, it is not limited to this, and for example, a method by which only the shading correction data whose brightness value is higher, is used, may also be allowable.

As described above, the following effects can be obtained by the document reading apparatus and image forming apparatus of the present invention.

According to the document reading apparatus according to Structure (1) or (2), in either case of when a document is read out by the document read out system while a document is moved or when the document is read out by the scanning exposure read out system while a document is stationary, the abnormality of the unnecessary light due to the stain at the collection position of the shading correction data, or the position dislocation of the collection position, can be detected, thereby, the correct shading correction can be stably conducted, and the document can be accurately read out.

According to the document reading apparatus according to Structure (3), in either case of when the document is read out by the document read out system, or when the document is read out by the scanning exposure read out system, the influence of the adhering of the dust to the collection position of the shading correction data can be prevented, and the correct shading correction is stably conducted, and the document can be accurately read out.

According to the document reading apparatus according to Structure (4), in either case of when the document is read out by the document read out system, or when the document is read out by the scanning exposure read out system, the abnormality of unnecessary light due to the stain at the collection position of the shading correction data, or the position dislocation of the collection position, can be detected, thereby, the correct shading correction is stably conducted, and the document can be accurately read out.

Further, according to the document reading apparatus of the present invention, because the movement direction of the collection position is moved in the center line direction of the density plate, there is no increase of the unnecessary light by the correction, and it becomes an appropriate collection position.

Further, according to the document reading apparatus of the present invention, because the movement of the collection position is automatically conducted, the shading correction can be easily and surely conducted.

Further, according to the image forming apparatus of the present invention, because it is equipped with the document reading apparatus of the present invention, the correct reference density correction for the shading correction is attained, and the high image quality image with the appropriate image density can be obtained.

What is claimed is:

1. A document reading apparatus comprising:
   an optical system including an exposure unit which is operable as at least one of: (i) a stationary document reading system which scans and exposes a stationary document placed on a platen while the exposure unit moves so as to read an image of the stationary document, and (ii) a moving document reading system which scans and exposes a moving document while the exposure unit is stationary so as to read an image of the moving document; and a reference density plate for shading correction which is provided so as to extend along a main scanning direction on a platen glass for the moving document reading system so as to face the exposure unit of the optical system;

wherein the optical system scans, along the main scanning direction, both a first collection position and a second collection position on the reference density plate, which are at different positions on the reference density plate along a sub-scanning direction that is perpendicular to the main scanning direction, so as to obtain first shading correction data and second shading correction data, respectively, for performing the shading correction; and wherein one of the first collection position and the second collection position is corrected to a new position along the sub-scanning direction, based on the obtained first and second shading correction data.

2. The document reading apparatus of claim 1, wherein when a difference between the first shading correction data and the second shading correction data is more than a predetermined value, one of the first and second collection positions at which the corresponding shading correction data shows a lower brightness value is moved in the sub-scanning direction by a predetermined distance and is made a new collection position, and then the shading correction is carried out based on shading correction data read out at the new collection position and the shading correction data corresponding to the other one of the first and second collection positions.

3. The document reading apparatus of claim 1, wherein, in the obtained first and second shading correction data, data corresponding to predetermined intervals along the first and second collection positions are evaluated to determine whether the data differs by more than a predetermined value between adjacent intervals, and when there is a difference that is larger than the predetermined value between data corresponding to any adjoining intervals, the one of the first and second collection positions corresponding to the shading correction data having the difference is moved by a predetermined distance in the sub-scanning direction and is made a new collection position, and then the shading correction is carried out based on shading correction data read out at the new collection position and the one of the first and second shading correction data that does not include the difference.

4. The document reading apparatus of claim 1, wherein an average value of each of the first and second shading correction data is determined, and when a difference between the average values is larger than a predetermined value, one of the first and second collection positions that corresponds to shading correction data that has an average value having a greater absolute difference with respect to a predetermined reference value is moved by a predetermined distance in the sub-scanning direction and is made a new collection position, and then the shading correction is carried out based on shading collection data read out at the new collection position and the shading correction data corresponding to the other one of the first and second collection positions.

5. The document reading apparatus of claim 1, wherein a moving direction along which the one of the first collection position and the second collection position is corrected to the new collection position is a direction toward a center line of the reference density plate which extends in the main scanning direction and passes through a center of the reference density plate when observed along the sub-scanning direction.

6. The document reading apparatus of claim 1, wherein correction of the collection position is automatically carried out.

7. An image forming apparatus comprising a document reading apparatus, which comprises:

an optical system including an exposure unit which is operable as at least one of: (i) a stationary document reading system which scans and exposes a stationary document placed on a platen while the exposure unit moves so as to read an image of the stationary document, and (ii) a moving document reading system which scans and exposes a moving document while the exposure unit is stationary so as to read an image of the moving document; and a reference density plate for shading correction which is provided so as to extend along a main scanning direction on a platen glass for the moving document reading system so as to face the exposure unit of the optical system;

wherein the optical system scans, along the main scanning direction, both a first collection position and a second collection position on the reference density plate, which are at different positions on the reference density plate along a sub-scanning direction that is perpendicular to the main scanning direction, so as to obtain first shading correction data and second shading correction data, respectively, for performing the shading correction; and wherein one of the first collection position and the second collection position is corrected to a new position along the sub-scanning direction, based on the obtained first and second shading correction data.

8. The image forming apparatus of claim 7, wherein when a difference between the first shading correction data and the second shading correction data is more than a predetermined value, one of the first and second collection positions at which the corresponding shading correction data shows a lower brightness value is moved in the sub-scanning direction by a predetermined distance and is made a new collection position, and then the shading correction is carried out based on shading correction data read out at the new collection position and the shading correction data corresponding to the other one of the first and second collection positions.

9. The image forming apparatus of claim 7, wherein, in the obtained first and second shading correction data, data corresponding to predetermined intervals along the first and second collection positions are evaluated to determine whether the data differs by more than a predetermined value between adjacent intervals, and when there is a difference that is larger than the predetermined value between data corresponding to any adjoining intervals, the one of the first and second collection positions corresponding to the shading correction data having the difference is moved by a predetermined distance in the sub-scanning direction and is made a new collection position, and then the shading correction is carried out based on shading correction data read out at the new collection position and the one of the first and second shading correction data that does not include the difference.

10. The image forming apparatus of claim 7, wherein an average value of each of the first and second shading correction data is determined, and when a difference between the average values is larger than a predetermined value, one of the first and second collection positions that corresponds to shading correction data that has an average value having a greater absolute difference with respect to a predetermined reference value is moved by a predetermined distance in the sub-scanning direction and is made a new collection position, and then the shading correction is carried out based on shading collection data read out at the new collection position and the shading correction data corresponding to the other one of the first and second collection positions.

11. The image forming apparatus of claim 7, wherein a moving direction along which the one of the first collection position and the second collection position is corrected to the new collection position is a direction toward a center line of the reference density plate which extends in the main scanning direction and passes through a center of the reference density plate when observed along the sub-scanning direction.

12. The image forming apparatus of claim 7, wherein correction of the collection position is automatically carried out.

* * * * *